United States Patent
Chen et al.

(10) Patent No.: US 9,135,676 B2
(45) Date of Patent: Sep. 15, 2015

(54) IMAGE INTERPOLATION PROCESSING APPARATUS AND METHOD THEREOF

(75) Inventors: Chung-Yi Chen, Hsinchu Hsien (TW); Chia-Hao Chung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 444 days.

(21) Appl. No.: 12/903,411

(22) Filed: Oct. 13, 2010

(65) Prior Publication Data
US 2011/0116547 A1     May 19, 2011

Related U.S. Application Data

(60) Provisional application No. 61/262,112, filed on Nov. 17, 2009.

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| G06T 3/40 | (2006.01) |
| H04N 7/01 | (2006.01) |

(52) U.S. Cl.
CPC .. *G06T 3/40* (2013.01); *H04N 7/014* (2013.01)

(58) Field of Classification Search
CPC ............ H04N 19/00781; H04N 5/145; H04N 19/00684; H04N 19/0066; H04N 19/00545; H04N 19/00909; H04N 19/00703; G06T 7/2013

USPC ....................................................... 375/240.16
See application file for complete search history.

(56) References Cited

U.S. PATENT DOCUMENTS

| | | | |
|---|---|---|---|
| 2001/0021224 A1* | 9/2001 | Larkin et al. ............. | 375/240.16 |
| 2005/0265451 A1* | 12/2005 | Shi et al. .................. | 375/240.15 |
| 2007/0230830 A1* | 10/2007 | Ohwaki et al. ................ | 382/300 |

FOREIGN PATENT DOCUMENTS

CN          101496063 A       7/2009

* cited by examiner

*Primary Examiner* — Joseph Ustaris
*Assistant Examiner* — Farhan Mahmud
(74) *Attorney, Agent, or Firm* — Edell, Shapiro & Finnan, LLC

(57) ABSTRACT

An image interpolation processing apparatus includes a motion vector generating module, for generating a first reference motion vector and a second reference motion vector for an interpolated block of an interpolated frame according to the interpolated block and a plurality of blocks adjacent to the interpolated block; a blurred block processing module, for determining an area property of the interpolation block being one of an image covered area, an image uncovered area and a non-blurred area according to the first reference motion vector and the second reference motion vector, and a representative motion vector of the interpolated block being one of the first reference motion vector and the second reference motion vector; and a frame interpolation module, for generating an image content of the interpolated block according to the representative motion vector and the area property.

17 Claims, 13 Drawing Sheets

| $MV_{-22}$ | $MV_{-12}$ | $MV_{02}$ | $MV_{12}$ | $MV_{22}$ |
| --- | --- | --- | --- | --- |
| $MV_{-21}$ | $MV_{-11}$ | $MV_{01}$ | $MV_{11}$ | $MV_{21}$ |
| $MV_{-20}$ | $MV_{-10}$ | $MV_{00}$ | $MV_{10}$ | $MV_{20}$ |
| $MV_{-2-1}$ | $MV_{-1-1}$ | $MV_{0-1}$ | $MV_{1-1}$ | $MV_{2-1}$ |
| $MV_{-2-2}$ | $MV_{-1-2}$ | $MV_{0-2}$ | $MV_{1-2}$ | $MV_{2-2}$ |

Figure 3A

IMAGE INTERPOLATION PROCESSING APPARATUS AND METHOD THEREOF

CROSS REFERENCE TO RELATED PATENT APPLICATION

This patent application claims the benefit of U.S. provisional patent application No. 61/262,112, filed on Nov. 17, 2009, which is incorporated herein by reference in its entirety.

FIELD OF THE INVENTION

The present invention relates to an image interpolation processing apparatus, and more particularly, to an image processing apparatus and a method thereof capable of determining an image within an image covered area or an image uncovered area of an interpolated frame.

BACKGROUND OF THE INVENTION

In the conventional image interpolation mechanism, a motion vector of a block in an interpolated frame is determined by a block matching algorithm, and the block is generated according to the motion vector. FIG. 1 shows a schematic diagram of the block matching algorithm. Frames Fn−1 and Fn are two successive input image frames, and an interpolated frame FI is generated by the conventional image interpolation mechanism between frames Fn−1 and Fn. Areas R4 and R5 respectively are part of the foreground object of the frames Fn−1 and Fn, and other areas belong to the background image. A first reference motion vector MV1 in FIG. 1 represents the moving direction of the foreground object, and a second reference motion vector MV2 represents the moving direction of the background image. In addition, an area R3' in the frame Fn is covered by the foreground object in the frame Fn−1 and thereby not presenting in the frame Fn−1. Likewise, an area R6' of the frame Fn−1 is covered by the foreground object in the image frame Fn and thereby not presenting in the frame Fn. Therefore, when the motion vector is determined via the conventional block matching algorithm, areas R1, R2, R7 and R8 are observed in the background images of the two frames Fn−1 and Fn, and the areas R4 and R5 covered by the foreground objects are observed in the two frames Fn−1 and Fn, so as to accurately determine a target motion vector, and to accurately generate the image areas R1, R2, R4, R5, R7 and R8 in the interpolated frame FI as shown in FIG. 1.

However, when target motion vectors of areas R3 and R6 in the interpolated frame FI are determined, since the area R3 in the interpolated frame FI only presents in an area R3' of the frame Fn but not in the image frame Fn−1, the conventional block matching algorithm does not work to find a true motion vector for the area R3 from the two frames Fn−1 and Fn. Likewise, since the area R6 in the interpolated frame FI only presents in an area R6' of the frame Fn−1 but not in the frame Fn, the conventional block matching algorithm does not work to find a true motion vector for the area R6 from the two frames Fn−1 and Fn. Therefore, when the motion vector is determined via the conventional block matching algorithm, an overall quality of the interpolated frame FI is reduced due to the uncovered area R3 and the covered area R6.

Theoretically, both motion vectors of the areas R3 and R6 in the interpolated frame FI are the motion vectors of the background image, so that the corresponding background images are accurately displayed on the areas R3 and R6. For example, the second motion vector MV2 is adopted to determine the image of the area R3 from the area R3' of the frame Fn, and the second motion vector MV2 is also adopted to determine the image of the area R6 from the area R6' in the frame Fn−1. Therefore, the block matching algorithm cannot determine the accurate motion vectors for the uncovered area R3 and the covered area R6, thus causing image distortions of the interpolation areas R3 and R6. When the block matching algorithm is applied to frame rate conversion, image quality of the frame is significantly reduced by using the conventional image interpolation mechanism.

SUMMARY OF THE INVENTION

Therefore, one object of the present invention is to provide an image processing apparatus and a method thereof capable of accurately determining an image of an interpolated block to solve the foregoing problems.

According to an embodiment of the present invention, an image processing interpolation apparatus for interpolating a motion frame determines a representative motion vector of an image covered area and an image uncovered area of an interpolated frame comprising a plurality of blocks. The apparatus comprises a motion vector generating module, for generating a first reference motion vector and a second reference motion vector for an interpolated block of an interpolated frame according to the interpolated block and a plurality of blocks adjacent to the interpolated block; a blurred block processing module, for determining an area property of the interpolation block being one of the image covered area, the image uncovered area and non-blurred area according to the first reference motion vector and the second reference motion vector, and a representative motion vector of the interpolated block being one of the first reference motion vector and the second reference motion vector; and a frame interpolation module, for generating an image content of the interpolated block according to the representative motion vector and the area property.

According to another embodiment of the present invention, an image interpolation processing method for interpolating a motion frame comprises generating a first reference motion vector and a second reference motion vector for an interpolated block of an interpolated frame according to the interpolated block and a plurality of blocks adjacent to the interpolated block; determining an area property of the interpolation block being one of the image covered area, the image uncovered area and non-blurred area according to the first reference motion vector and the second reference motion vector, and a representative motion vector of the interpolated block being one of the first reference motion vector and the second reference motion vector; and generating the image content of the interpolated block according to the representative motion vector and the area property.

An advantage of the present invention is that, when a block in fact is within an image covered area or an image uncovered area, a background motion vector (i.e., either a first reference motion vector or a second reference motion vector) and an area property (i.e., being either of the image covered area and the image uncovered area) of the block is determined according to the foregoing image interpolation apparatus and the method thereof to generate an accurate image and thereby improve image quality. When the block is within neither the image covered area nor the image uncovered area, an accurate image is generated according to an original motion vector of the block according to the foregoing image interpolation apparatus and the method thereof without undesirably affecting the image quality, wherein the original motion vector is a motion vector calculated with respect to the block via a block matching algorithm.

BRIEF DESCRIPTION OF THE DRAWINGS

FIG. 3A is a schematic diagram of values representing motion vector variances calculated by the motion vector generating module in FIG. 2.

DETAILED DESCRIPTION OF THE PREFERRED EMBODIMENT

Figure 1:
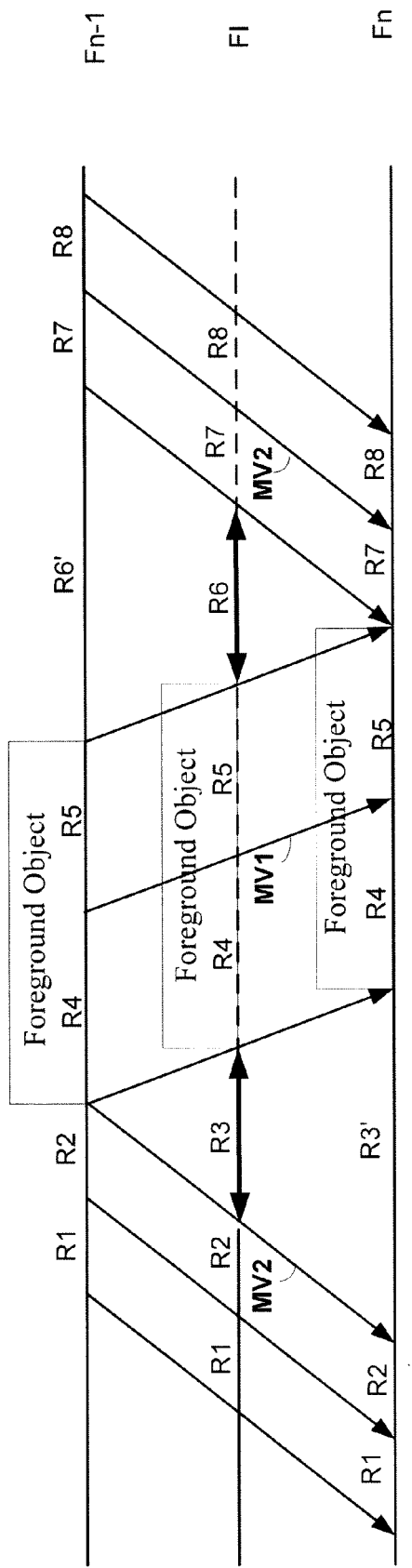
FIG. 1 is a schematic diagram of operations of a conventional block matching algorithm.

For reading convenience, in the following description, a background image area not being shielded in a previous frame but being shielded by a foreground object in a next frame is referred to as an "image covered area," and a background image area being shielded by the foreground object in the previous frame but presenting in the next frame (i.e., not being shielded by the foreground object) is referred to as an "image uncovered area." For example, the area R6 in the interpolated frame FI in FIG. 1 is the image covered area, and the area R3 is the image uncovered area. It is to be noted that, such definitions are employed for purposes of illustration, and shall not be a limitation of the present invention.

Figure 2:
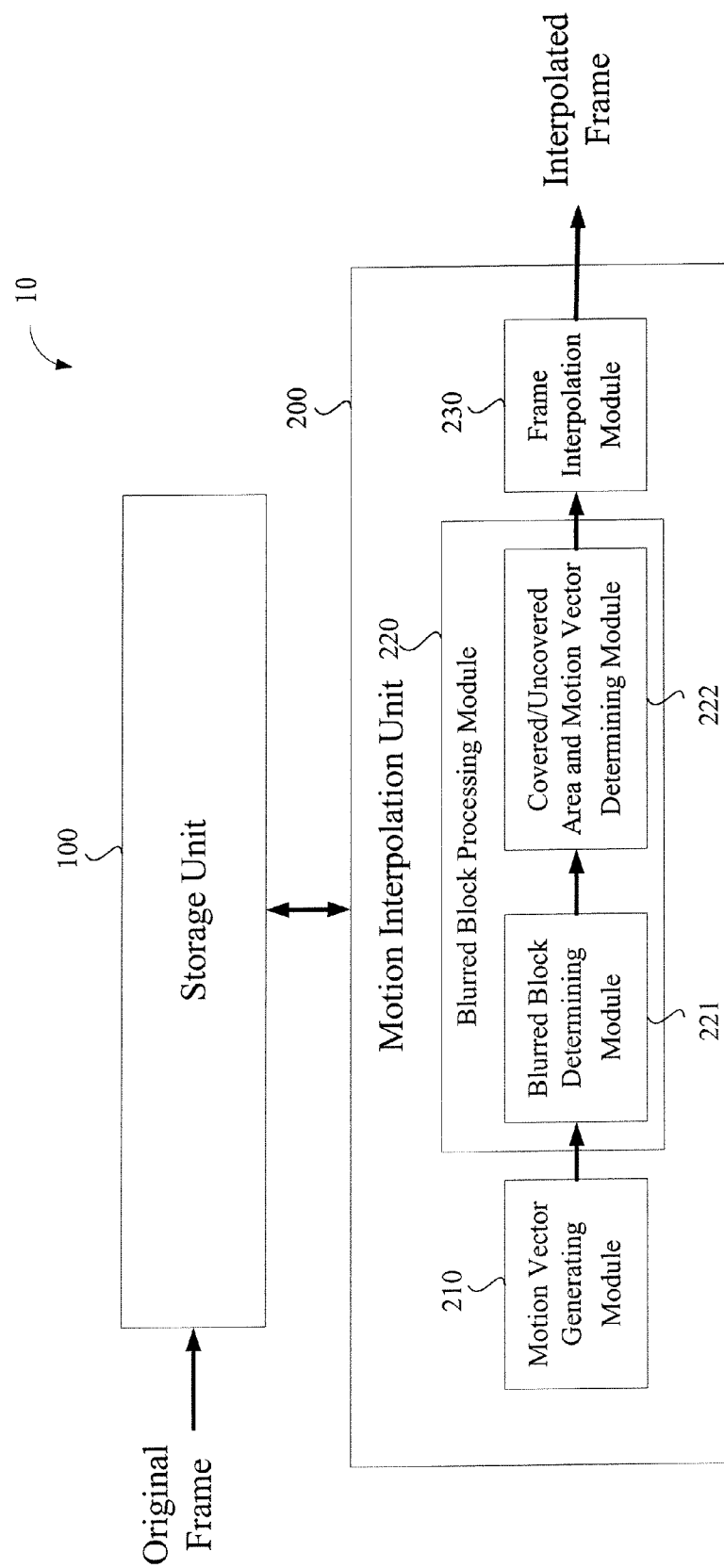
FIG. 2 is a block diagram of components of an image processing apparatus in accordance with a first embodiment of the present invention.

FIG. 2 shows a block diagram of an image processing apparatus 10 in accordance with a first embodiment of the present invention. The image processing apparatus 10 determines a motion vector of an image covered area/an image uncovered area of an interpolated frame when interpolating a motion frame, and the interpolated frame comprises a plurality of blocks. The image processing apparatus 10 comprises a storage unit 100 and a motion interpolation unit 200. The storage unit 100 stores a plurality of original frames, interpolated frames, and original motion vectors generated via block matching. The motion interpolation unit 200 coupled to the storage unit 100 comprises a motion vector generating module 210, a blurred block processing module 220, and a frame interpolation module 230. The motion vector generating module 210 determines a first reference motion vector MV1 and a second reference motion vector MV2 of a block of the interpolated frame (i.e., a first interpolated frame). In this embodiment, the motion vector generating module 210 generates two corresponding reference motion vectors MV1 and MV2 with respect to each block of the interpolated frame, and each block comprises 16×8 pixels; however, other block sizes are also considered to be within the scope of the present invention. The blurred block processing module 220, comprising a blurred block determining module 221 and a covered/uncovered area and motion vector determining module 222, determines whether the block is within the image covered area or the image uncovered area according to the first reference motion vector MV1 and the second reference motion vector MV2, and determines a representative motion vector of the block. The blurred block determining module 221 determines whether the block is within a blurred area according to a difference between the first reference motion vector MV1 and the second reference motion vector MV2 of the block. The covered/uncovered area and motion vector determining module 222 performs covered/uncovered block determination and representative motion vector determination on the block in the blurred area. The frame interpolation module 230 generates the interpolated image of the block according to the representative motion vector and a result of the block being within either the image covered area or the image uncovered area.

In practice, in this embodiment, the motion interpolation unit 200 interpolates at least one interpolated frame between every two adjacent original frames of original frames Fn−2, Fn−1, Fn and Fn+1. Taking the original frames Fn−2, Fn−1, Fn and Fn+1 as an example, the foreground object moves from left to right in a horizontal direction, and the background image moves from right to left in the horizontal direction. It is to be noted that, the horizontal direction is taken as an example for illustration purposes; however, a motion in any direction (e.g., a vertical direction or a motion direction at any angle) may also be processed by the foregoing image processing apparatus 10 according to the present invention.

Figure 3B:
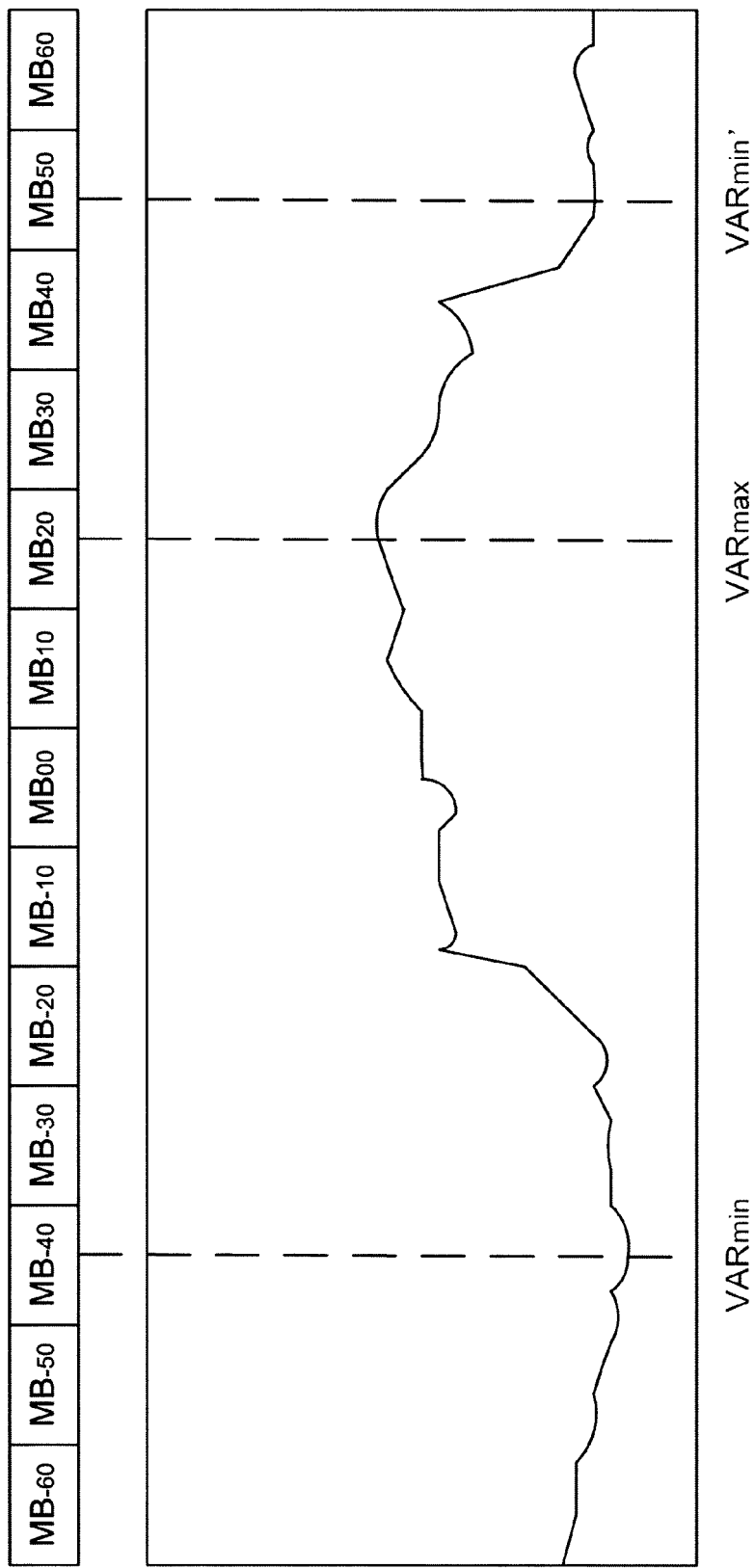
FIG. 3B is a schematic diagram of a value curve comprising a plurality of motion vector variances.

The following description is given with reference to FIG. 3A and FIG. 3B, which show a schematic diagram of generating two reference motion vectors MV1 and MV2 of an interpolated block. The motion vector generating module 210 generates two reference motion vectors MV1 and MV2 with respect to each interpolated block of each interpolated frame. The motion vector generating module 210 calculates motion vectors of associated interpolated blocks according to the block matching algorithm, and calculates variance degrees with respect to the motion vector and a plurality of motion vectors of a plurality of adjacent blocks to generate a value curve. In this embodiment, the value curve is a curve formed by variance degrees of the motion vectors in the horizontal direction of a certain interpolated block, and each of the variance degrees represents a motion vector variance of the motion vector, i.e., the value curve comprises a plurality of values representing different motion vector variances in a predetermined direction. FIG. 3A shows a schematic diagram of calculating values representing motion vector variance degrees. For example, when motion vectors, calculated according to the block matching algorithm, of a first interpolated block and a plurality of adjacent blocks (e.g., within a 5×5 block range in FIG. 3A) are respectively $MV_{00}$ and $MV_{-2-2}$ to $MV_{22}$, a motion vector variance MV_VAR is calculated according to the plurality of motion vectors. A calculation approach of the motion vector variance MV_VAR is to add up an absolute value of a difference generated from subtracting a smallest horizontal component from a largest horizontal component of the plurality of motion vectors and an absolute value of a difference generated from subtracting a smallest vertical component from a largest vertical component of the plurality of motion vectors, i.e., the motion vector variance MV_VAR is calculated as:

$$\text{MV\_VAR} = |\text{MAX}(MV_x) - \text{MIN}(MV_x)| + |\text{MAX}(MV_y) - \text{MIN}(MV_y)|, \quad (1)$$

where $MV_x$ and $MV_y$ respectively represent a horizontal component (i.e., an x-axis component) and a vertical component (i.e., a y-axis component). It is to be noted that, the 5×5 block range is not a limitation of the present invention, and an N×N or N×M block range may also be adopted in the present invention, where parameters N and M are positive integers and N is not equal to M. In addition, the motion vector variance MV_VAR is accordingly calculated as:

$$\text{MV\_VAR} = |\text{MAX}(MV_x) - \text{MIN}(MV_x)| + |\text{MAX}(MV_y) - \text{MIN}(MV_y)| + \text{SAD}, \quad (2)$$

and $$MV\_VAR = \alpha \times \{|MAX(MV_x) - MIN(MV_x)| + |MAX(MV_y) - MIN(MV_y)|\} + \beta \times SAD \quad (3)$$

Where the value SAD is a block matching difference of the first interpolated block calculated according to the block matching algorithm, and parameters α and β are weights. Any variation for representing the value of the motion vector variance degree is within the scope of the present invention. As mentioned above, according to one of Equation 1, Equation 2 and Equation 3, the motion vector generating module 210 in sequence calculates with respect to different interpolated blocks to obtain a first value curve CV as shown in FIG. 3B.

FIG. 3B shows a schematic diagram of the first value curve CV comprising a plurality of motion vector variances. Supposing that $MB_{00}$ represents the first interpolated block, the motion vector generating module 210 determines two reference motion vectors MV1 and MV2 of the interpolated block $MB_{00}$. For a direction (e.g., the horizontal direction) that a background or foreground image moves towards, the motion vector generating module 210 selects a maximum value (e.g., VARmax in FIG. 3B) from a plurality of motion vector variances corresponding to a plurality of blocks spatially extended on two sides of the first interpolated block $MB_{00}$ (e.g., six blocks of same sizes $MB_{10}$ to $MB_{60}$ and $MB_{-10}$ to $MB_{-60}$ on both of two sides of the first interpolated block $MB_{00}$ in the horizontal direction), and determines two blocks corresponding to minimum values selected from the plurality of motion vector variances on the left and right sides of the maximum value VARmax, e.g., blocks $MB_{-40}$ and $MB_{50}$ are determined. Motion vectors, of the left and right blocks $MB_{-40}$ and $MB_{50}$, generated via the block matching algorithm serve as the reference motion vectors MV1 and MV2 of the first interpolated block $MB_{00}$. In other words, the first reference motion vector MV1 of the first interpolated block $MB_{00}$ corresponds to the minimum value VARmin on the left side of the maximum value VARmax of the first value curve CV, and the second reference motion vector MV2 of the first interpolated block $MB_{00}$ corresponds to the minimum value VARmin' on the right side of the maximum value VARmax. One of the first reference motion vector MV1 and the second reference motion vector MV2 is the background motion vector and the other one is the foreground motion vector because motion vector variances of blocks around the interpolated block within the image covered area or the image uncovered area are extremely large. Blocks corresponding to the minimum motion vector variances on the left side and the right side of the maximum value may correspond to the foreground motion vector or the background motion vector according to whether the blocks are within the image covered area or the image uncovered area. Therefore, when the first interpolated block $MB_{00}$ is within either the image covered area or the image uncovered area, one of the first reference motion vector MV1 and the second reference motion vector MV2 corresponds to the background motion vector, and the other one corresponds to the foreground motion vector. Through the foregoing operations, the motion vector generating module 210 calculates first and second reference motion vectors MV1 and MV2 corresponding to each interpolated block of an interpolated frame FI.

FIG. 4A to FIG. 4D show schematic diagrams of determining a blurred block being within an image covered area or an image uncovered area and a representative motion vector in accordance with the first embodiment of the present invention. The blurred block determining module 221 determines whether a block is within a blurred area according to a difference between a first reference motion vector MV1 and a second motion vector MV2 of the block. When the first reference motion vector MV1 and the second reference motion vector MV2 of the block are similar to each other, it is determined that the block is not within the blurred area (in the non-blurred area); when the difference between the first reference motion vector MV1 and the second reference motion vector MV2 is large, it is determined that the block is within the blurred area. A difference MV_Diff is generated from adding up an absolute value of a difference generated by subtracting a horizontal component of the second reference motion vector MV2 from a horizontal component of the first reference motion vector MV1 and an absolute value of a difference generated by subtracting a vertical component of the second reference motion vector MV2 from a vertical component of the first reference motion vector MV1, i.e., the difference MV_Diff is calculated as:

$$MV\_Diff = |MV_{1x} - MV_{2x}| + |MV_{1y} - MV_{2y}|. \quad (4)$$

Equation 4 is described as an example and is not a limitation of the present invention.

Figure 4A:
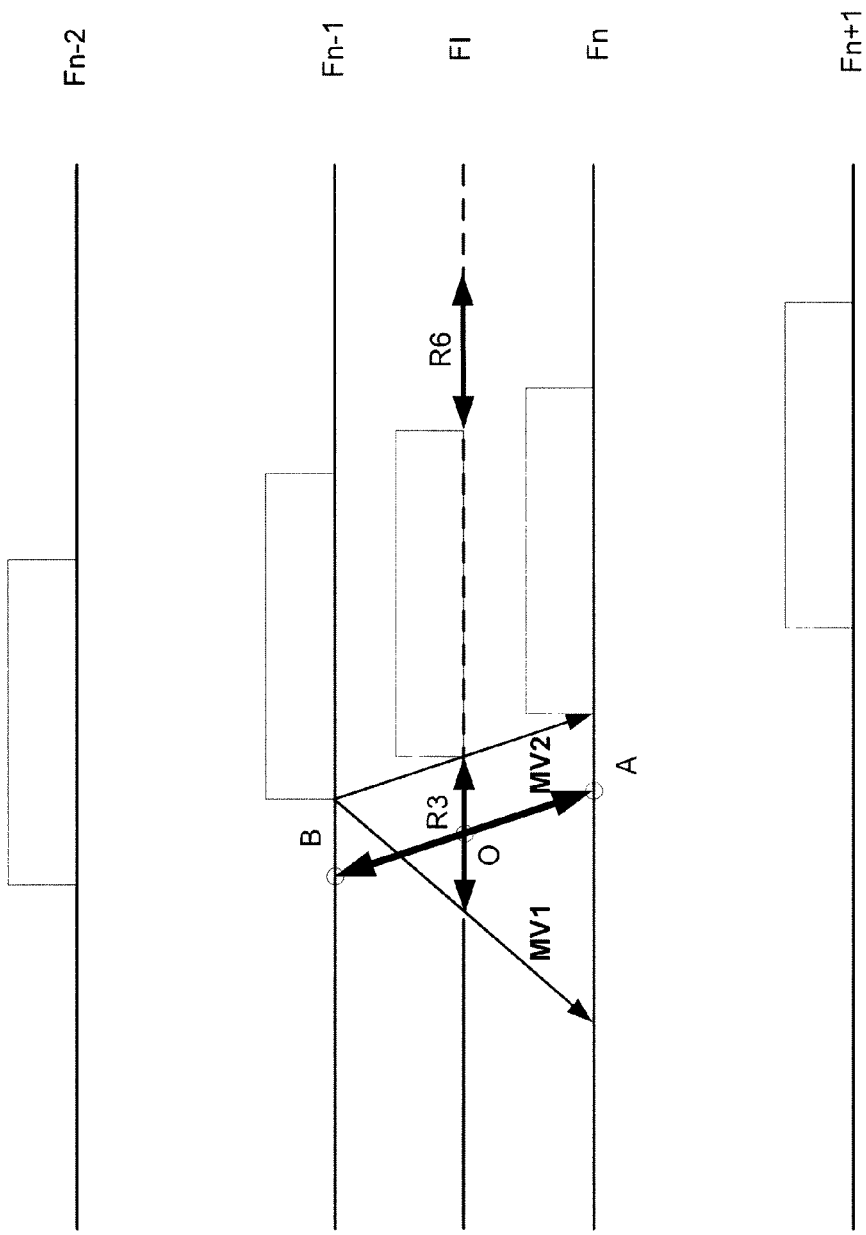
FIG. 4A to FIG. 4D are schematic diagrams of the blurred block processing module in FIG. 2 in accordance with the first embodiment of the present invention.
Figure 4B:
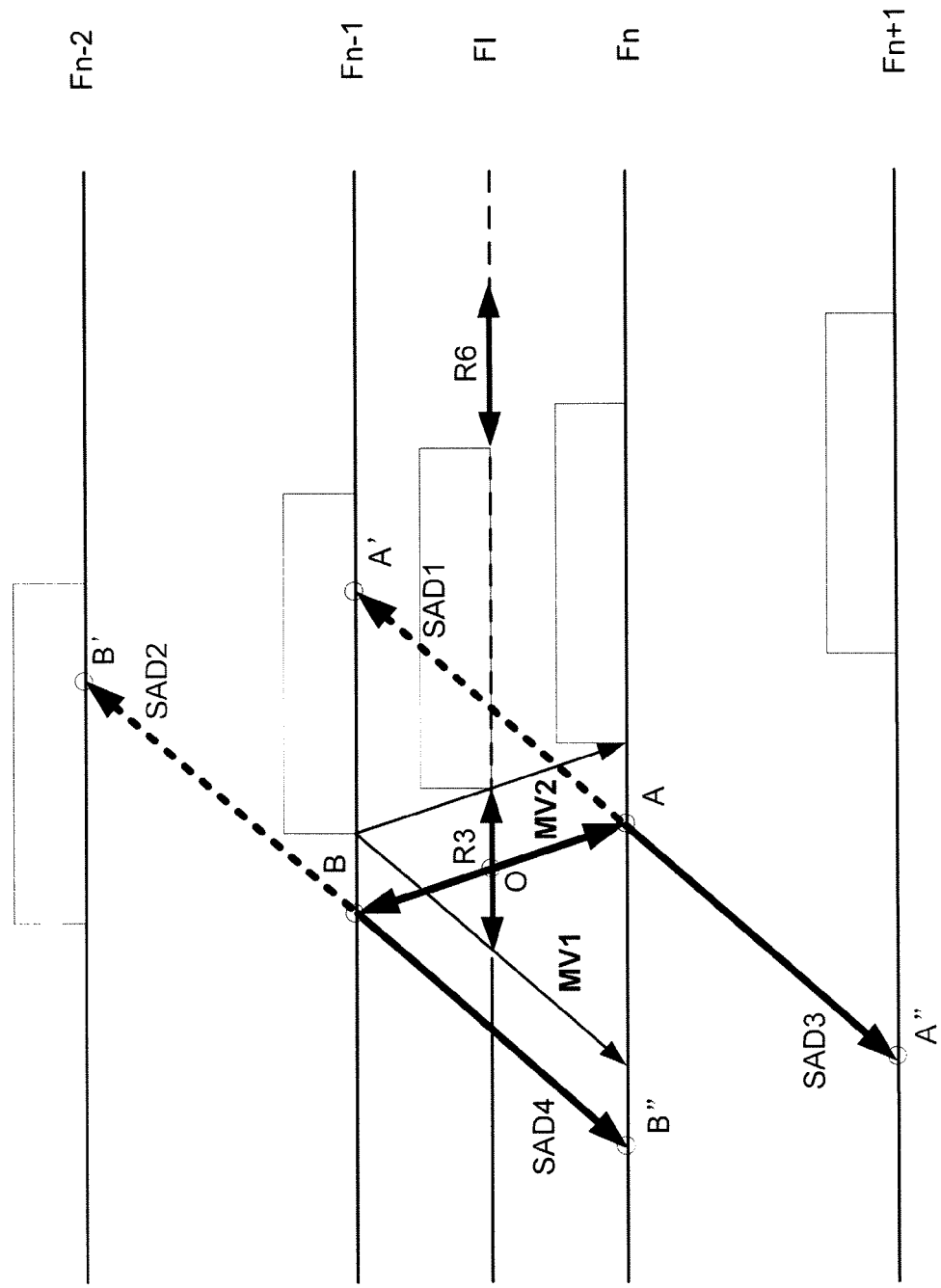

The covered/uncovered area and motion vector determining module 222 further performs covered/uncovered area determination and representative motion vector determination on the block of the interpolated frame. In FIG. 4A, an interpolated frame FI is interpolated between original frames Fn−1 and Fn, and areas R3 and R6 are within the blurred area. The following description takes the area R3 as an example to gain a better understanding of the present invention. A to-be-determined block O within the area R3 is shielded by a foreground object in the original frame Fn−1, i.e., the to-be-determined block O does not present in the original frame Fn−1, but presents in the original frame Fn (i.e., the area R3 is within the image uncovered area). Two motion vectors of the to-be-determined block O are respectively a first reference motion vector MV1 and a second reference motion vector MV2. Referring to FIG. 4A, the block O corresponds to a block B in the original frame Fn−1 and a block A in the original frame Fn according to the second reference motion vector MV2. Referring to FIG. 4B, the block A and the block B respectively correspond forward to a block A' and a block B'. More specifically, the block A of the original frame Fn corresponds forward to the block A' in the original frame Fn−1, and the block B of the original frame Fn−1 corresponds to the block B' in an original fame Fn−2. In this embodiment, a difference SAD1 between the block A and the block A' and a difference SAD2 between the block B and the block B' are calculated via a block matching sum of absolute difference (SAD) approach. Likewise, the block A and the block B correspond backward to a block A" in the original frame Fn+1 and a block B" in the original frame Fn according to the first reference motion vector MV1, and a difference SAD3 between the block A and the block A" and a difference SAD4 between the block B and the block B" are calculated.

Figure 4C:
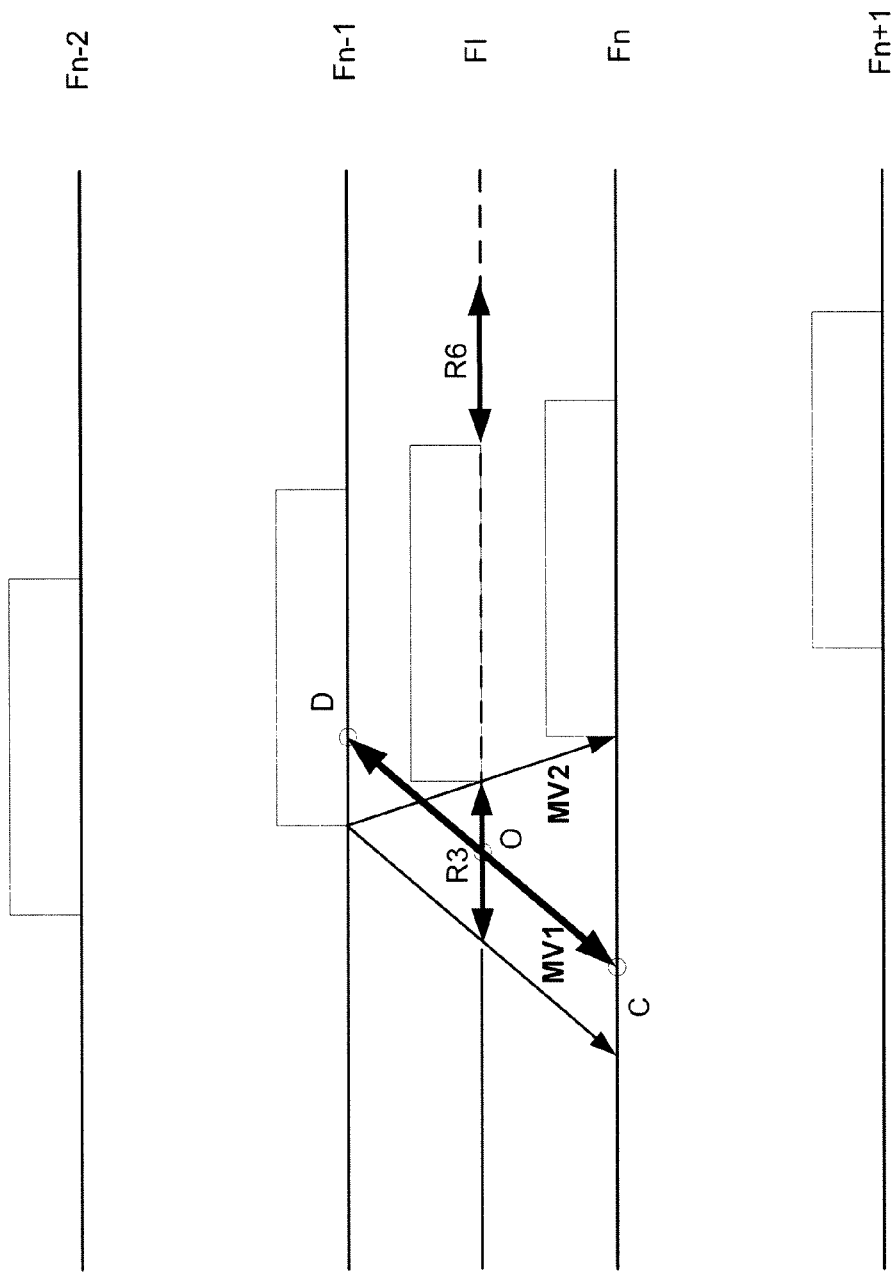
Figure 4D:
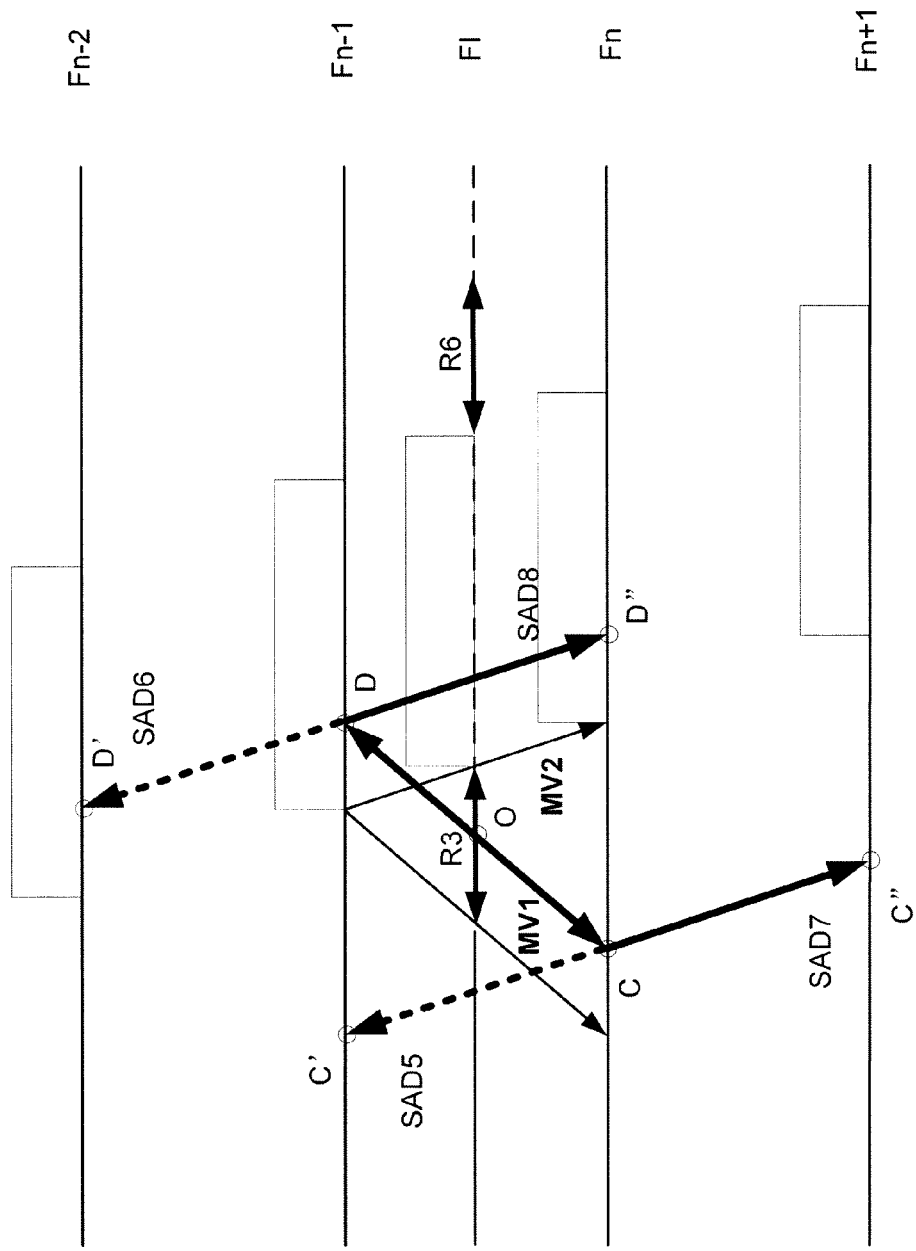

Referring to FIG. 4C, the block O corresponds to a block C in the original frame Fn and a block D in the original frame Fn−1 according to the first reference motion vector MV1. Referring to FIG. 4D, the block C and the block D correspond forward to a block C' and a block D' according to the second reference motion vector MV2. More specifically, the block C in the original frame Fn corresponds forward to the block C' in the original frame Fn−1, and the block D in the original frame Fn−1 corresponds to the block D' in the original frame Fn−2. Likewise, a difference SAD5 between the block C and the block D and a difference SAD6 between the block C' and the block D' are calculated via the block matching SAD approach. Likewise, the block C and the block D correspond backward to a block C" in the original frame Fn+1 and a block D" in the original frame Fn according to the second reference motion vector MV2, and a difference SAD7 between the block C and the block C" and a difference SAD8 between the block D and the block D".

It is determined the block O is within the image covered area or the image uncovered area according to the differences SAD1 to SAD8 as well as determining that a representative motion vector MVO of the block O is either the first reference motion vector MV1 or the second reference motion vector MV2. More specifically, when the difference SAD1 and the difference SAD2 are smaller than a threshold TH1, it is determined that the block O is within the image covered area, and the representative motion vector MVO is the first reference motion vector MV1; when the difference SAD3 and the difference SAD4 are smaller than the threshold TH1, it is determined that the block O is within the image uncovered area, and the representative motion vector MVO is the first reference motion vector MV1; when the difference SAD5 and the difference SAD6 are smaller than the threshold TH1, it is determined that the block O is within the image covered area, and the representative motion vector MVO is the second reference motion vector MV2; and when the difference SAD7 and the difference SAD8 are smaller than the threshold TH1, it is determined that the block O is within the image uncovered area, and the representative motion vector MVO is the second reference motion vector MV2, where the threshold TH1 is a predetermined value. In this embodiment, the first reference motion vector MV1 is a background motion vector, and the second reference motion vector MV2 is a foreground motion vector. In addition, as observed from FIG. 4B, since the difference SAD1 is the difference between the block A and the block A', the block A is within a background area and the block A' is within a foreground area, the difference SAD1 is large; since the difference SAD2 is the difference between the block B and the block B', the block B is within the background area and the block B' is within the foreground area, the difference SAD2 is large; since the difference SAD3 is the difference between the block A and the block A", which are within the background area and correspond to the background motion vector, the difference SAD3 is smaller; since the difference SAD4 is the difference between the block B and the block B", which are within the background area and correspond to the background motion vector, the difference SAD4 is small. Likewise, as observed from FIG. 4D, since the differences SAD5 and SAD7 are large, the differences SAD6 and SAD8 are small. According to the foregoing determination rules, in this embodiment, the differences SAD3 and SAD4 are smaller than a predetermined value, such that it is determined that the block O is within the image uncovered area, and the representative motion vector MVO is the first reference motion vector MV1.

In addition, FIG. 5A to FIG. 5D show schematic diagrams of determining a blurred block being within an image covered area or an image uncovered area and a representative motion vector in accordance with a second embodiment. The blurred block determining module 221 determines an interpolated block being within one of the image covered area, the image uncovered area and non-blurred area according to a difference between a first reference motion vector MV1 and a second reference motion vector MV2 of the interpolated block. Likewise, when the first reference motion vector MV1 and the second reference motion vector MV2 are similar to each other, it is determined that the block is not within the blurred area; when the difference between the first reference motion vector MV1 and the second reference motion vector MV2 is large, it is determined that the block is within the blurred area. An approach for calculating a difference MV_Diff is the same as that in the first embodiment.

Figure 5A:
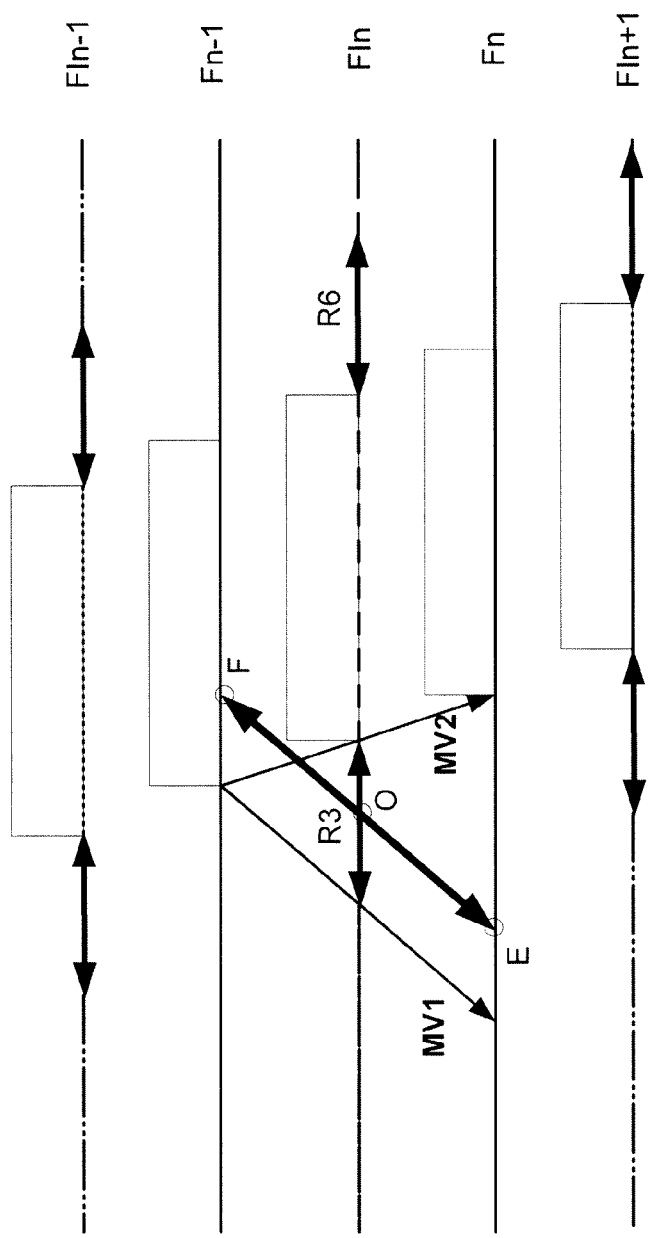
FIG. 5A to FIG. 5D are schematic diagrams of the blurred block processing module in FIG. 2 in accordance with a second embodiment of the present invention.
Figure 5B:
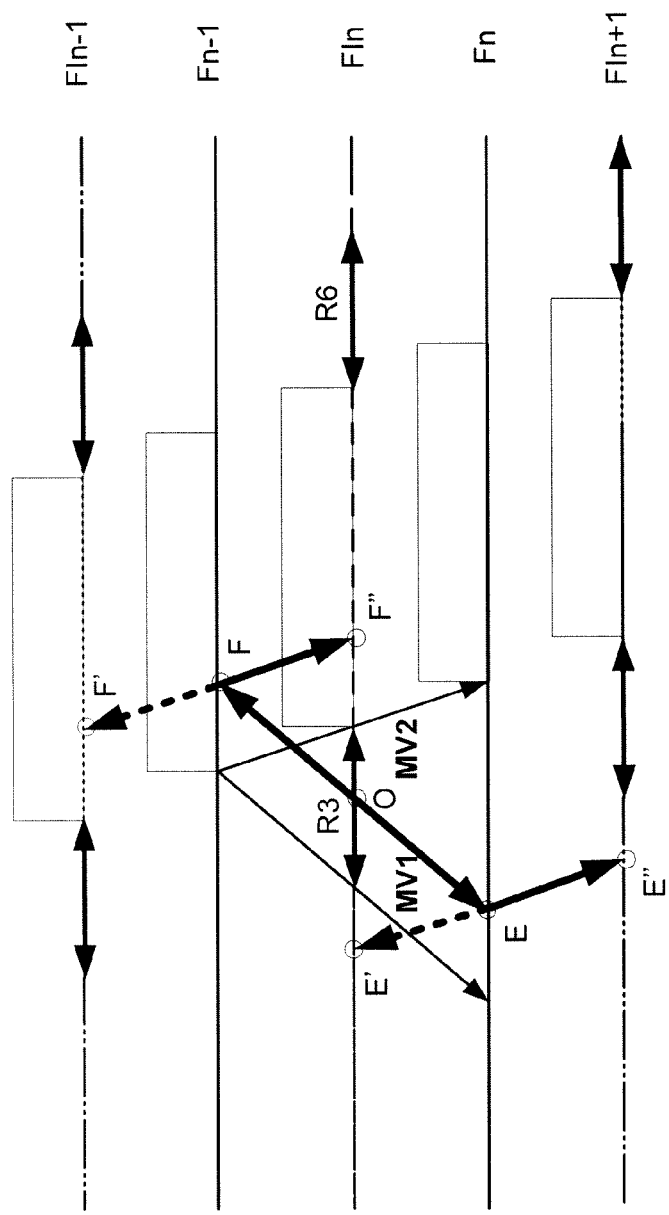

The covered/uncovered area and motion vector determining module 222 further performs covered/uncovered block determination and representative motion vector determination on the interpolated block within the blurred area. Referring to FIG. 5A, an interpolated frame FIn is interpolated between original frames Fn−1 and Fn, areas R3 and R6 are within the blurred area. The following description takes the area R3 as an example to gain a better understanding of the present invention. A to-be-determined block O being within the area R3 is shielded by a foreground object in the original frame Fn−1, i.e., the to-be-determined block O does not present in the original frame Fn−1, but presenting in the original frame Fn (i.e., the area R3 is within the image uncovered area). Two motion vectors of the block O are respectively a first reference motion vector MV1 and a second reference motion vector MV2. Referring to FIG. 5A, the block O corresponds to a block E in the original frame Fn and a block F in the original frame Fn−1 according to the first reference motion vector MV1. Referring to FIG. 5B, the block E and the block F respectively correspond forward to a block E' and a block F' according to the second reference motion vector MV2. More specifically, the block E in the original frame Fn corresponds forward to the block E' in the interpolated frame FIn, and the block F corresponds to the block F' in the interpolated frame FIn−1. After that, it is determined whether a motion vector MVE' of the block E' and a motion vector MVF' of the block F' are similar to the second reference motion vector MV2. Likewise, the block E and the block F correspond backward to a block E" and a block F" according to the second reference motion vector MV2, and it is determined whether a motion vector MVE" of the block E" and a motion vector MVF" of the block F" are similar to the second reference motion vector MV2.

Figure 5C:
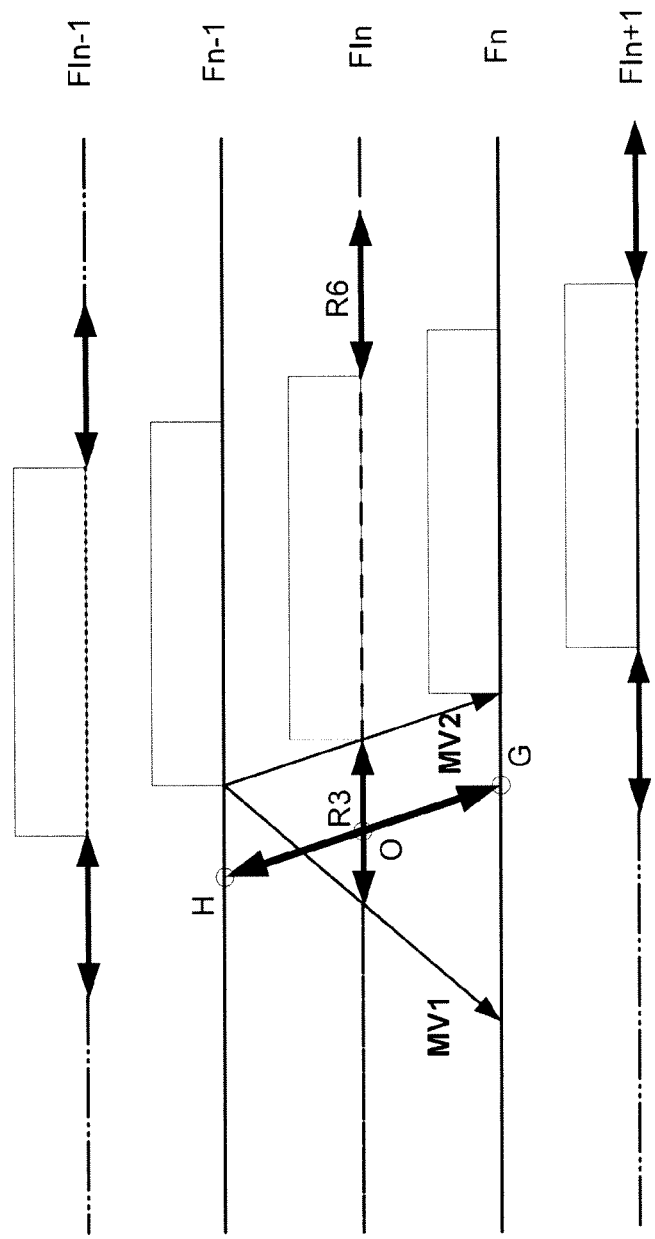
Figure 5D:
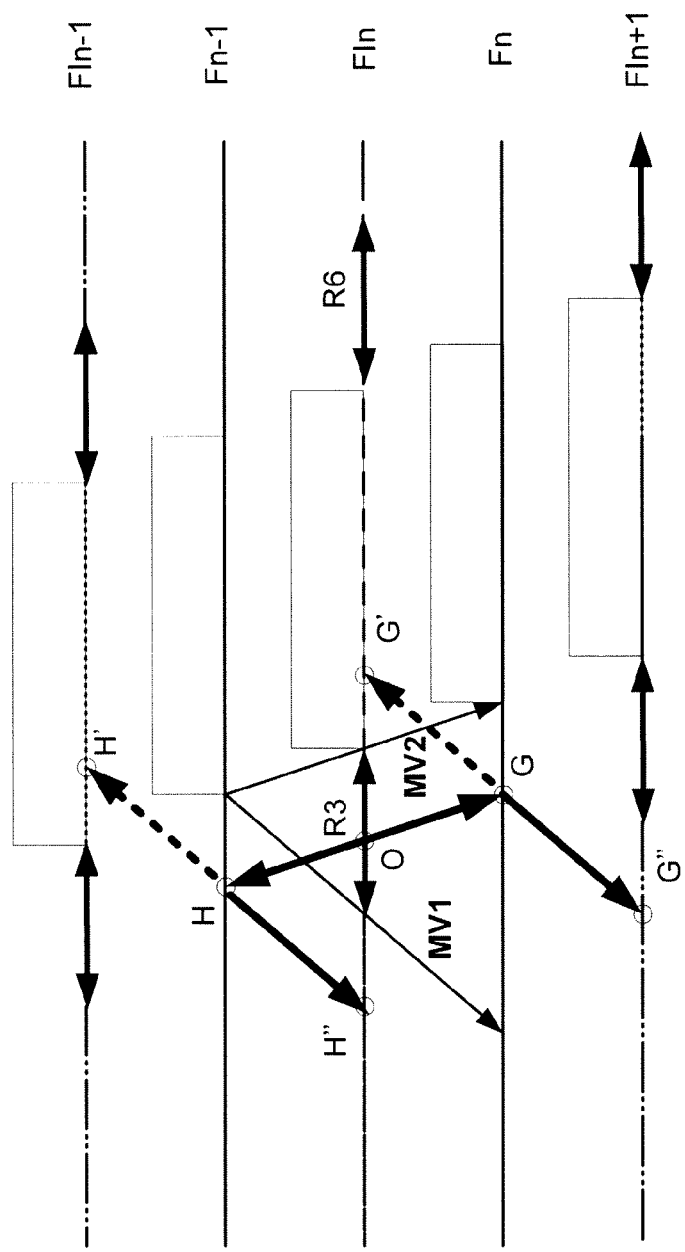

Referring to FIG. 5C, the block O corresponds to a block G in the original frame Fn and a block H in the original frame Fn−1 according to the second reference motion vector MV2. Referring to FIG. 5D, the block G and the block H correspond forward to a block G' and a block H' according to the first reference motion vector MV1. More specifically, the block G in the original frame Fn correspond forward to the block G' in the interpolated frame FIn, and the block H correspond to the block H' in an interpolated frame FIn−1. After that, it is determined whether a motion vector MVG' of the block G' and a motion vector MVH' of the block H' are similar to the first reference motion vector MV1. Likewise, the block G and the block H correspond backward to a block G" and a block H" according to the first reference motion vector MV1, and it is determined whether a motion vector MVG" of the block G" and a motion vector MVH" of the block H" are similar to the first reference motion vector MV1.

It is determined whether the block O is within the image covered area or the image uncovered area according to the foregoing motion vectors MVE', MVF', MVE", MVF", MVG', MVH', MVG", and MVH", and it is determined whether the representative motion vector MVO of the block O is either the first reference motion vector MV1 or the second reference motion vector MV2. More specifically, when the motion vector MVE' and the motion vector MVF' are similar to the second reference motion vector MV3, it is determined the block O is within the image covered area, and the representative motion vector MVO is the second reference motion vector. When the motion vector MVE" and the motion vector MVF" are similar to the second reference motion vector MV3, it is determined the block O is within the image uncovered area, and the representative motion vector MVO is the second reference motion vector. When the motion vector MVG' and the motion vector MVH' are similar to the first reference motion vector MV1, it is determined that the block O is within the image covered area, and the representative motion vector MVO is the first reference motion vector MV1. When the motion vector MVG" and the motion vector MVH" are similar to the first reference motion vector MV1, it is determined that the block O is within the image uncovered area, and the representative motion vector MVO is the first reference motion vector MV1. In this embodiment, the first reference motion vector MV1 is a background motion vector, and the second reference motion vector MV2 is a foreground motion vector. In addition, as observed from FIG. 5B, since the block E' is within a background area and the block F' is within a foreground area, the motion vector MVE' is not similar to the second reference motion vector MV2, but the motion vector MVF' is similar to the second reference motion vector MV2. Since the block E" is within the background area, and the block F" is within the foreground area, the motion vector MVE" is not similar to the second reference motion vector MV2, but the motion vector MVF" is similar to the second reference motion vector MV2. Likewise, as observed from FIG. 5D, the motion vectors MVG' and MVH' are not similar to the first reference motion vector MV1, and the motion vectors MVG" and MVH" are similar to the first reference motion vector MV1. According to the foregoing determination rules, in this embodiment, since the difference between the motion vector MVG" and the first reference motion vector MV1 and the difference between the motion vector MVH" and the first reference motion vector MV1 are smaller than a predetermined value, it is determined that the block O is within the image uncovered area, and the representative motion vector MVO is the first reference motion vector MV1.

The frame interpolation module 230 generates an interpolated frame image of the block according to the representative motion vector and the result whether the block is within either the image covered area or the image uncovered area. More specifically, when the block O is within the image uncovered area, and the representative motion vector MVO is the first reference motion vector MV1, the block O is interpolated as the block in the original frame Fn corresponding forward to the block O according to the first reference motion vector MV1. When the block O is within the image uncovered area, and the representative motion vector MVO is the second reference motion vector MV2, the block O is interpolated as the block in the original frame Fn corresponding forward to the block O according to the second reference motion vector MV2. When the block O is within the image covered area, and the representative motion vector MVO is the first reference motion vector MV1, the block O is interpolated as the block in the original frame Fn−1 corresponding backward to the block O according to the second reference motion vector MV1. When the block O is within the image covered area, and the representative motion vector MVO is the first reference motion vector MV2, the block O is interpolated as the block in the original frame Fn−1 corresponding backward to the block O according to the second reference motion vector MV2. In FIG. 4A or FIG. 5A, according to the determination of the blurred block processing module 220, the block O is within the image uncovered area and the representative motion vector MVO is the first reference motion vector MV1, such that the frame interpolation module 230 interpolates the block O into the block in the original frame Fn corresponding forward to the block O according to the first reference motion vector MV1.

In addition, when an interpolated block is in fact within the blurred area (i.e., the image covered area or the image uncovered area), the frame interpolation module 230 generates an accurate image of the block according to the determined area property and the representative motion vector determined by the blurred block processing module 220 to improve the image quality, and the representative motion vector of the blurred block corresponds to the background motion vector. When the interpolated block is not within the blurred area (i.e., the image covered area or the image uncovered area), the frame interpolation module 230 generates the accurate image according to the motion vector of the interpolated block according to the block matching algorithm. Further, the frame interpolation module 230 generates the interpolated frame FIn.

Figure 6:
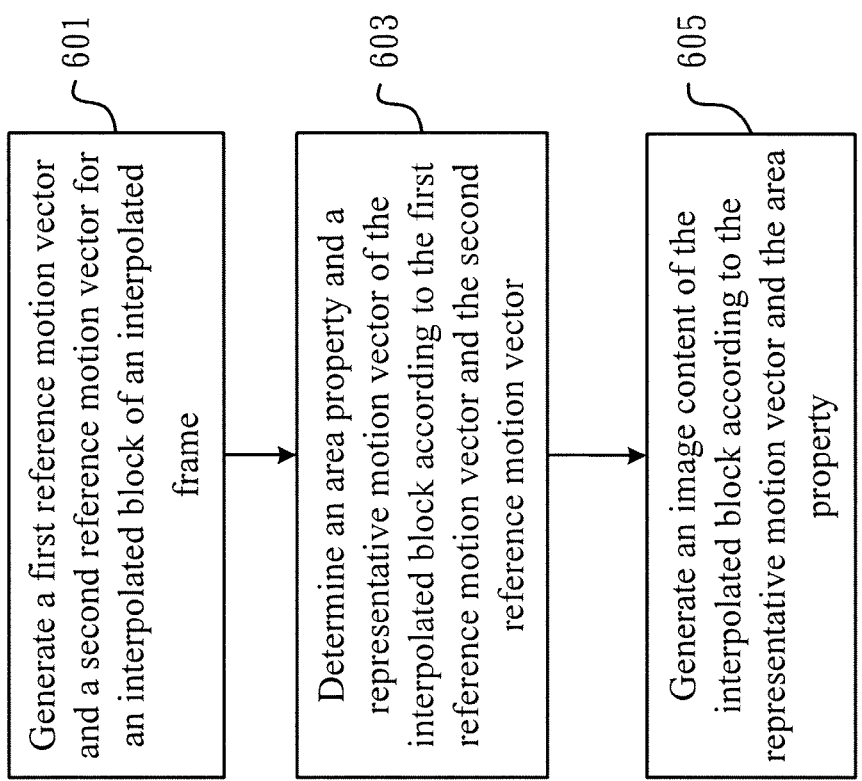
FIG. 6 is a flow chart of an image processing method in accordance with a third embodiment of the present invention.

FIG. 6 shows a flow chart of operations of an image processing method in accordance with a third embodiment of the present invention. The method comprises steps described below. In Step 601, a first reference motion vector MV1 and a second reference motion vector MV2 of an interpolated block of an interpolated frame (i.e., a first interpolated frame) are generated. More specifically, motion vectors of associated blocks of the interpolated block are calculated, and variance degrees of the motion vectors of the associated blocks are generated according to a motion vector of each associated block and a plurality of motion vectors of a plurality of adjacent blocks to calculate a value curve. The two reference motion vectors MV1 and MV2 are determined according to the value curve. Detailed description of Step 601 may be with reference to the description corresponding to FIG. 3A and FIG. 3B, and shall not be described for brevity. In Step 603, according to the first reference motion vector MV1 and the second reference motion vector MV2 of the block, it is determined that an area property of the interpolated block is one of an image covered area, an image uncovered area and a non-blurred area, and a representative motion vector of the interpolated block. For example, it is determined whether the interpolated block is within a blurred area according to a difference between the first reference motion vector MV1 and the second reference motion vector MV2. A first block and a second block corresponding to the interpolated block are respectively determined from a previous original frame and a next original frame of the interpolated frame according to the first reference motion vector MV1. According to the second reference motion vector MV2, a third block and a fourth block respectively corresponding to the first block and the second block are respectively determined from respective previous original frames of the first block and the second block, and a fifth block and a sixth block respectively corresponding to the first block and the second block are respectively determined from respective next original frames of the first block and the second block. A similarity of the determined blocks is calculated to determine the area property of the interpolated block is one of the image covered area, the image uncovered area and the non-blurred area, and to determine the representative motion vector of the interpolated block, and detailed description thereof is with reference to the description associated with FIG. 4A and FIG. 4D and shall not be described for brevity. In another embodiment, a first block and a second block corresponding to the interpolated block are respectively determined from a previous original frame and a next original frame of the interpolated frame according to the first reference motion vector MV1. According to the second reference motion vector MV2, motion vectors of a third block and a fourth block respectively corresponding to the first block and the second block are respectively determined from respective previous original frames of the first block and the second block, and motion vectors of a fifth block and a sixth block are determined from respective next original frames of the first block and the second block. The motion vectors of the fifth block and the sixth block are respectively compared with the second reference motion vector MV2 to determine the area property of the interpolated block is one of the image covered area, the image uncovered area and the non-blurred area, and to determine the representative motion vector, and detailed description thereof is with reference to the description associated with FIG. 5A to FIG. 5D and shall not be described for brevity. In Step 605, an image content of the interpolated block is generated according to the representative motion vector and the area property. More specifically, when the block is within the image uncovered area, the image content of the interpolated block is generated from the next original frame according to the representative motion vector. When the block is within the image covered area, the interpolated block is interpolated from the previous original frame according to the representative motion vector.

While the invention has been described in teams of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image interpolation processing apparatus, comprising:
   a motion vector generator configured to generate a first reference motion vector and a second reference motion vector for an interpolated block of an interpolated frame according to the interpolated block and a plurality of blocks adjacent to the interpolated block, the interpolated frame being interpolated between a previous original image frame and a next original image frame, wherein: to generate the first reference motion vector and the second reference motion vector, the motion vector generator is configured to: calculate a value curve as a plurality of motion vector variances with respect to an original motion vector of the interpolated block and a plurality of original motion vectors of the plurality of adjacent blocks; select a maximum value of the plurality of motion vector variances of the value curve; and determine a first block and a second block of the plurality of adjacent blocks corresponding to a minimum value on the left side of the maximum value of the value curve and a minimum value on the right side of the maximum value of the value curve, respectively, wherein the first reference motion vector and the second reference motion vector correspond to an original motion vector of the first block and an original motion vector of the second block, respectively;
   a blurred block processor configured to determine an area property for the interpolated block as being one of an image covered area, an image uncovered area and a non-blurred area according to the first reference motion vector and the second reference motion vector, wherein an image covered area is a background image area visible in the previous original image frame but covered by a foreground object in the next original image frame, an image uncovered area is a background image area covered in the previous original image frame by a foreground object but visible in the next original image frame, and a non-blurred area is a background image area visible in both the previous and next original image frames, the blurred block processor being further configured to determine a representative motion vector for the interpolated block as being one of the first reference motion vector and the second reference motion vector, wherein the blurred block processor comprises:
      a covered/uncovered block and motion vector processor configured to: respectively determine a first block and a second block corresponding to the interpolated block from the previous original image frame and the next original image frame according to the first reference motion vector; respectively determine a third block and a fourth block corresponding to the first block and the second block from respective previous original image frames of the first block and the second block according to the second reference motion vector; respectively determine a fifth block and a sixth block corresponding to the first block and the second block from respective next original image frames of the first block and the second block according to the second reference motion vector; and calculate differences of corresponding blocks to determine the area property of the interpolated block as being one of the image covered area, the image uncovered area and non-blurred area, and to determine the representative motion vector of the interpolated block as being one of the first reference motion vector and the second reference motion vector; and
   a frame interpolator configured to generate the interpolated block according to the representative motion vector and the area property.

2. The apparatus as claimed in claim 1, wherein the covered/uncovered block and motion vector processor is configured to calculate a first difference between the first block and the third block, a second difference between the second block and the fourth block, a third difference between the first block and the fifth block, and a fourth difference between the second block and the sixth block.

3. The apparatus as claimed in claim 2, wherein the covered/uncovered block and motion vector processor is configured to:
   determine that the area property of the interpolated block is the image covered area and the representative motion vector of the interpolated block is the second reference motion vector in response to the first difference and the second difference being smaller than a first predetermined value; and
   determine that the area property of the interpolated block is the image uncovered area and the representative motion vector of the interpolated block is the second reference motion vector in response to the third difference and the fourth difference being smaller than the first predetermined value.

4. The apparatus as claimed in claim 1, wherein the blurred block processor is further configured to determine whether the interpolated block is within a blurred area according to a difference between the first reference motion vector and the second reference motion vector, wherein the interpolated block is determined to be within the blurred area in response to the difference being larger than a second predetermined value, and the interpolated block is determined to be not within the blurred area in response to the difference not being larger than the second predetermined value.

5. The apparatus as claimed in claim 1, wherein the blurred block processor is configured to generate a difference between the first reference motion vector and the second reference motion vector by adding an absolute horizontal component difference value between the first reference motion vector and the second reference motion vector to an absolute vertical component difference value between the first reference motion vector and the second reference motion vector.

6. The apparatus as claimed in claim 1, wherein the motion vector generator is configured to determine the first reference motion vector and the second reference motion vector according to an original motion vector of the interpolated block and a plurality of original motion vectors of a plurality of adjacent blocks.

7. The apparatus as claimed in claim 1, wherein the frame interpolator is configured to determine the interpolated block according to the previous original image frame and the representative motion vector in response to the area property being the image covered area, and is configured to determine the interpolated block according to the next original image frame and the representative motion vector in response to the area property being the image uncovered area.

8. The apparatus as claimed in claim 1, wherein the blurred block processor comprises:
 a covered/uncovered block and motion vector processor configured to:
 respectively determine a first block and a second block corresponding to the interpolated block from the previous original image frame and the next original image frame of the interpolated frame according to the first reference motion vector;
 respectively determine motion vectors of a third block and a fourth block respectively corresponding to the first block and the second block from respective previous original image frames of the first block and the second block according to the second reference motion vector;
 respectively determine motion vectors of a fifth block and a sixth block corresponding to the first block and the second block from respective next original image frames of the first block and the second block according to the second reference motion vector; and
 calculate differences between the motion vectors of the blocks and the second reference motion vector to determine the area property of the interpolated block as being within either the image covered area or the image uncovered area, and to determine the representative motion vector of the interpolated block as being either the first reference motion vector or the second reference motion vector.

9. An image interpolation processing method, comprising:
 generating a first reference motion vector and a second reference motion vector for an interpolated block of an interpolated frame according to the interpolated block and a plurality of blocks adjacent to the interpolated block, the interpolated frame being interpolated between a previous original image frame and a next original image frame, wherein the generating the first reference motion vector and the second reference motion vector includes: calculating a value curve as a plurality of motion vector variances with respect to an original motion vector of the interpolated block and a plurality of original motion vectors of the plurality of adjacent blocks; selecting a maximum value of the plurality of motion vector variances of the value curve; and determining a first block and a second block of the plurality of adjacent blocks corresponding to a minimum value on the left side of the maximum value of the value curve and a minimum value on the right side of the maximum value of the value curve, respectively, wherein the first reference motion vector and the second reference motion vector correspond to an original motion vector of the first block and an original motion vector of the second block, respectively;
 determining an area property for the interpolation block as being one of an image covered area, an image uncovered area and a non-blurred area according to the first reference motion vector and the second reference motion vector, wherein an image covered area is a background image area visible in the previous original image frame but covered by a foreground object in the next original image frame, an image uncovered area is a background image area covered in the previous original image frame by a foreground object but visible in the next original image frame, and a non-blurred area is a background image area visible in both the previous and next original image frames, and determining a representative motion vector for the interpolated block as being one of the first reference motion vector and the second reference motion vector, wherein determining the area property and the representative motion vector of the interpolated block comprises:
 determining a first block and a second block corresponding to the interpolated block from the previous original image frame and the next original image frame according to the first reference motion vector;
 determining a third block and a fourth block respectively corresponding to the first block and the second block from respective previous original image frames of the first block and the second block according to the second reference motion vector;
 determining a fifth block and a sixth block corresponding to the first block and the second block from respective next original image frames of the first block and the second block according to the second reference motion vector; and
 calculating differences of corresponding blocks to determine the area property of the interpolated block as being one of the image covered area, the image uncovered area and non-blurred area, and to determine the representative motion vector of the interpolated block as being one of the first reference motion vector and the second reference motion vector; and
 generating the interpolated block according to the representative motion vector and the area property.

10. The method as claimed in claim 9, wherein determining the differences of corresponding blocks comprises calculating a first difference between the first block and the third block, a second difference between the second block and the fourth block, a third difference between the first block and the fifth block, and a fourth difference between the second block and the sixth block.

11. The method as claimed in claim 10, wherein calculating the differences of corresponding blocks comprises determining that the interpolated block is within the image covered area and the second reference motion vector is the representative motion vector of the interpolated block in response to the first difference and the second difference being smaller than a first predetermined value, and determining the interpolated block is within the image uncovered area and the second reference motion vector is the representative motion vector of the interpolated block in response to the third difference and the fourth difference being smaller than the first predetermined value.

12. The method as claimed in claim 9, wherein determining the area property and the representative motion vector of the interpolated block comprises:
 determining whether the interpolated block is within the blurred area according to a difference between the first reference motion vector and the second reference motion vector, the interpolated block being determined to be within the blurred area in response to the difference being larger than a second predetermined value, the interpolated block being determined to be not within the blurred area in response to the difference not being larger than the second predetermined value.

13. The method as claimed in claim 9, wherein determining the area property and the representative motion vector of the interpolated block comprises generating a difference between the first reference motion vector and the second reference motion vector by adding an absolute horizontal component difference value between the first reference motion vector and the second reference motion vector to an absolute vertical component difference value between the first reference motion vector and the second reference motion vector.

14. The method as claimed in claim 9, wherein generating the first reference motion vector and the second reference motion vector of the interpolated block of the interpolated frame comprises determining the first reference motion vector and the second reference motion vector according to an original motion vector of the interpolated block and a plurality of original motion vectors of a plurality of adjacent blocks.

15. The method as claimed in claim 9, wherein generating the interpolated block comprises determining the interpolated block according to the previous original image frame of the interpolated block and the representative motion vector in response to the area property being the image covered area, and determining the interpolated block according to the next original image frame of the interpolated block and the representative motion vector in response to the area property being the image uncovered area.

16. The method as claimed in claim 9, wherein determining the representative motion vector and the area property of the interpolated block comprises:
  determining a first block and a second block corresponding to the interpolated block from the previous original image frame and the next original image frame of the interpolated frame according to the first reference motion vector;
  respectively determining motion vectors of a third block and a fourth block respectively corresponding to the first block and the second block from respective previous original image frames of the first block and the second block according to the second reference motion vector, and respectively determining of motion vectors a fifth block and a sixth block corresponding to the first block and the second block from respective next original image frames of the first block and the second block according to the second reference motion vector; and
  calculating differences between the motion vectors of the blocks and the second reference motion vector to determine the area property of the interpolated block as being within either the image covered area or the image uncovered area, and to determine the representative motion vector of the interpolated block as being either the first reference motion vector or the second reference motion vector.

17. An image interpolation processing apparatus, comprising:
  a motion vector generator configured to generate a first reference motion vector and a second reference motion vector for an interpolated block of an interpolated frame according to the interpolated block and a plurality of blocks adjacent to the interpolated block, the interpolated frame being interpolated between a previous original image frame and a next original image frame, wherein: to generate the first reference motion vector and the second reference motion vector, the motion vector generator is configured to: calculate a value curve as a plurality of motion vector variances with respect to an original motion vector of the interpolated block and a plurality of original motion vectors of the plurality of adjacent blocks; select a maximum value of the plurality of motion vector variances of the value curve; and determine a first block and a second block of the plurality of adjacent blocks corresponding to a minimum value on the left side of the maximum value of the value curve and a minimum value on the right side of the maximum value of the value curve, respectively, wherein the first reference motion vector and the second reference motion vector correspond to an original motion vector of the first block and an original motion vector of the second block, respectively;
  a blurred block processor configured to determine an area property for the interpolated block as being one of an image covered area, an image uncovered area and a non-blurred area according to the first reference motion vector and the second reference motion vector, wherein an image covered area is a background image area visible in the previous original image frame but covered by a foreground object in the next original image frame, an image uncovered area is a background image area covered in the previous original image frame by a foreground object but visible in the next original image frame, and a non-blurred area is a background image area visible in both the previous and next original image frames, the blurred block processor being further configured to determine a representative motion vector for the interpolated block as being one of the first reference motion vector and the second reference motion vector; and
  a frame interpolator configured to generate the interpolated block according to the representative motion vector and the area property.

* * * * *